July 29, 1969  W. E. CRANCH  3,458,687
ELECTRONIC COMPONENT TEST FIXTURE
Filed March 8, 1967  3 Sheets-Sheet 1

WILLIAM E. CRANCH
INVENTOR.
BY Roger A. Marrs

WILLIAM E. CRANCH
INVENTOR.

BY Roger A. Marrs

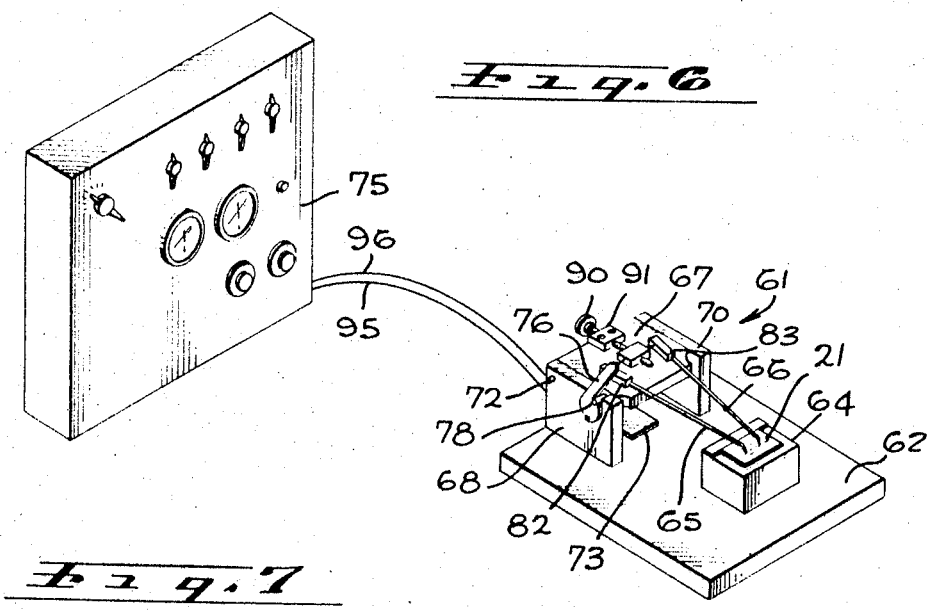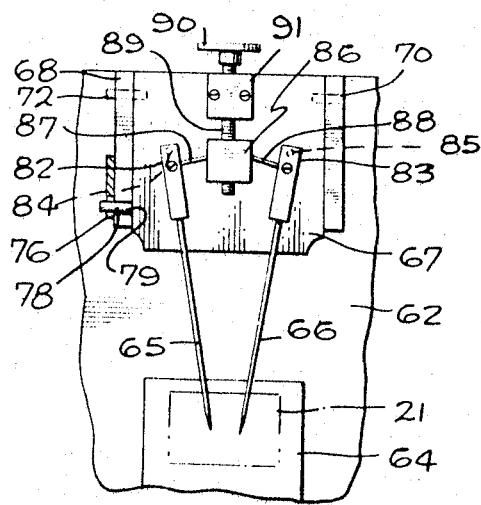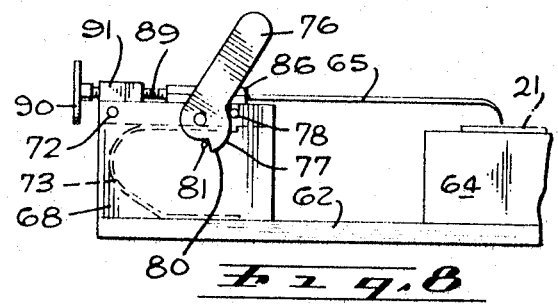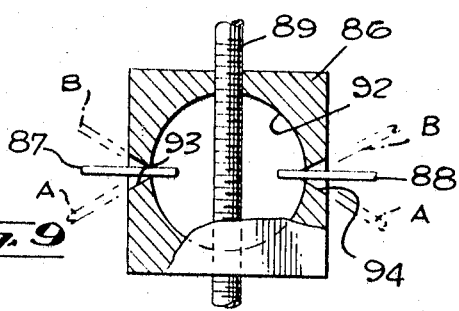

United States Patent Office 3,458,687
Patented July 29, 1969

3,458,687
ELECTRONIC COMPONENT TEST FIXTURE
William E. Cranch, Chatsworth, Calif., assignor to The Bunker-Ramo Corporation, Canoga Park, Calif., a corporation of Delaware
Filed Mar. 8, 1967, Ser. No. 621,684
Int. Cl. H05b 3/06; G01r 27/02; H01c 7/00
U.S. Cl. 219—521                            31 Claims

ABSTRACT OF THE DISCLOSURE

A test fixture for holding a substrate in registration with a heated probe or a pair of electrode probes employed for adjusting or checking the physical and electrical parameters of microminiature electrical components and employing limiting stop and resilient biasing means to insure that the probe, of either type, can be rapidly brought to a test position with respect to a component under test for mass production purposes.

---

The present invention relates in general to electronic component test fixtures and in particular to a test fixture for adjusting the resistance of a thin film resistor.

The present day trend toward the microminiaturization of electronic components has led to the development of thin film electronic components. In adjusting or checking such thin film electronic components, such as resistors, it is sometimes desirable to subject the components for a preselected length of time to a source of heat. Such thin film resistors generally comprise a very thin film of metal coated on a glass or ceramic substrate. It is apparent that such thin film resistors are extremely sensitive to excessive heat or to contact by an external source.

It has often been found necessary to alter the resistance of such thin film resistors. Such alteration was generally accomplished by removing material from the resistor itself as by scribing, etching, or cutting, or by the use of shorting bars, that is, conductors deposited across the resistor at points between the end electrodes. Recently, however, it has been found that the resistance value of a thin film resistor can be adjusted by heating the resistor to a relatively high temperature for a very short period of time. While the resistance of the resistor is being adjusted, the temperature coefficient of resistance of the resistor may also be adjusted to a very close tolerance. Furthermore, the temperature coefficient of resistance of the resistor may be adjusted without permanently changing the resistance value of the resistor, or with a change in resistance value of a predetermined amount. Such an adjustment method is described in copending application of John W. Ireland and James C. Holloway for U.S. Letters Patent, entitled "Thin-Film Resistor Adjustment," filed on Nov. 12, 1964, and bearing Ser. No. 410,439, reference to which is not necessary for a full and complete understanding of the present invention.

By the use of such a heating procedure, each resistor of a multi-resistor thin film network may be individually adjusted. Moreover, such heating of the thin film resistors may be accomplished in various ways. For example, heat may be applied to the individual resistor by passing a relatively high electrical current through the resistor, by bringing a hot probe adjacent to it, or by subjecting the resistor to a flow of hot gas.

In the present day microelectronic field, one of the principal concerns is the rapid measurement or adjustment of a series of parameters of a plurality of components all on a single substrate. In addition, electronic component test fixtures must be so designed that a succession of substrates having thin film components thereon may be rapidly placed in and removed from the test fixture without numerous adjustments having to be made for each substrate. This is especially true in the predescribed resistance adjustment technique, where it is necessary that the probes for passing the high electrical current through the resistor are properly aligned with respect to the resistor or that the heat probe brought adjacent to the thin film resistor is automatically arranged in a properly spaced relationship with respect to the substrate so that the component is not damaged by overheating, or by improper engagement in the case where the probes are a pair of electrodes. In each respective instance, the thin film resistor must be protected against damage from overheating or against damage from physical encounter with the heating equipment, which would scratch or mar the thin film element.

The present invention has succeeded in overcoming the disadvantages of the prior art devices and in accomplishing the above-recited objectives by providing an electronic component test fixture constructed in such a fashion that limit stops and resilient biasing means are employed for assuring that the probes are properly aligned in the case of a pair of electrodes or arranged in spaced relationship with respect to the heating probe so that the component is not damaged either by improper engagement or by overheating. By employing the stop means and the biasing means, probes of any suitable type can be properly placed in position with respect to an individual component to perform a particular test or adjustment and then moved to other components in the network for tests on a mass producion scale. In this fashion, individual adjustments of the fixture from component to component is not required. In addition, a succession of substrates having a like thickness and a common geometry may be placed in the fixture without fear of damage.

These and other advantages of the present invention will become more apparent from the following detailed specification, taken in conjunction with the accompanying drawings. It is to be understood, however, that the drawings are for purposes of illustration only and are not intended to be construed as a limit upon the invention. Furthermore, in the drawings, like reference numerals have been carried forward to illustrate like portions of the invention.

BRIEF DESCRIPTION OF THE DRAWINGS

FIG. 6 is a perspective view of another adjustment assembly or fixture of the present invention and illustrating a pair of cantilevered electrodes;

FIG. 7 is an enlarged plan view of the adjustment fixture shown in FIG. 6;

FIG. 8 is a side elevational view of the fixture shown in FIG. 7; and

FIG. 9 is an enlarged sectional view of the electrode mounting means employed in the fixture shown in FIG. 6.

Referring to FIGS. 1 and 2, a novel component adjustment and test assembly or fixture is shown in accordance with the present invention which is indicated in the general direction of arrow 10. The fixture 10 includes a base 11 upon which is supported a bridge balance unit 12 suitable for supplying test current and which houses circuitry attendant to performing predetermined tests on the components. A power supply 8 and a rheostat 9 are also provided. The base 11 has thereon a pad 13 which is used to support a U-shaped plate 14 which is pivotally mounted on the pad 13 by means of pivotal mounts 15 and 16. The end of the plate 14 opposite to its end pivotally carried by mounts 15 and 16 is supported by a post 17 which engages the under side of one leg of the plate 14 when the plate is at rest. Disposed within the opening defined by the legs of the U-shaped plate 14, there is provided a platen 18 fixedly supported on the end 13 by means of a plurality of posts, such as post 20. The platen 18 is employed as a base for a substrate 21 having a plurality of electrical components arranged in an electrical network thereon, such as a plurality of this film resistors.

Figure 1:
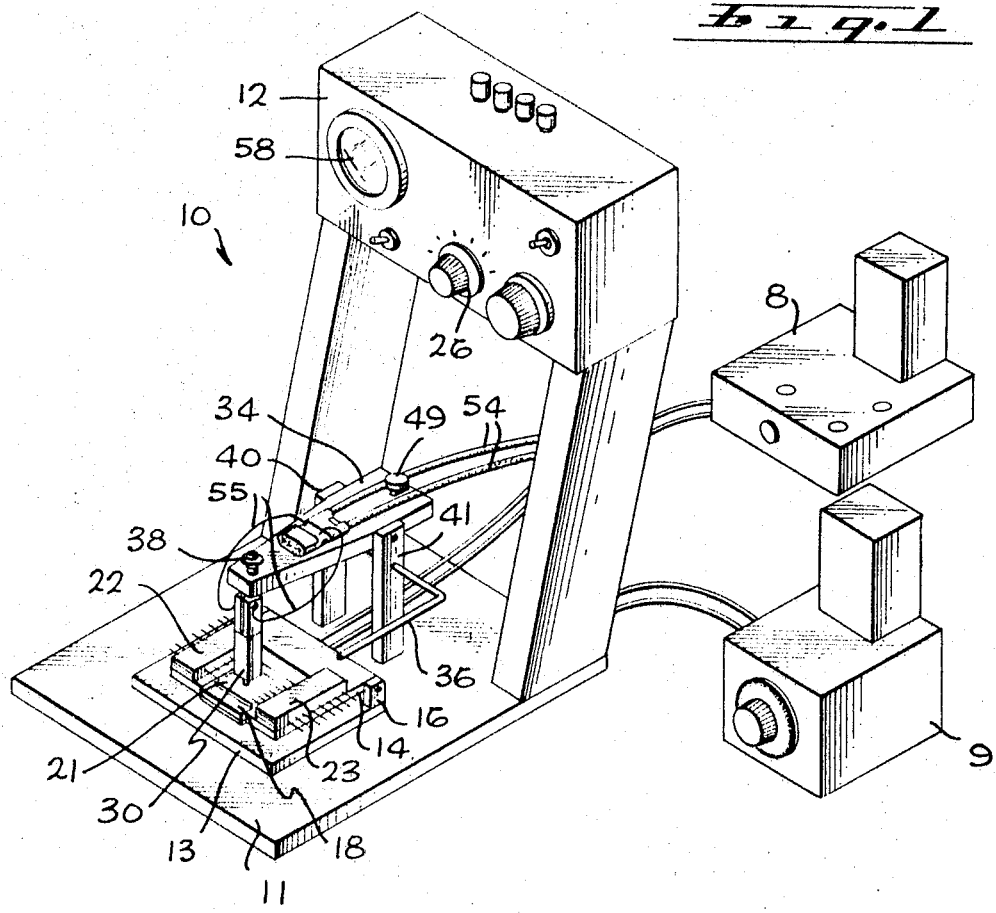
FIGURE 1 is a perspective view of an adjustment assembly or fixture incorporating the present invention and illustrating a heating probe.

A pair of spaced-apart probe units 22 and 23 are carried on the legs of the U-shaped member or plate 14 and are employed to individually interconnect with each resistor in the multi-resistor thin film network in concert with the application of heat to a particular resistor in the network. Electrical contact may be made with the resistors on the substrate 21 by using the multi-probe units 22 and 23, such as is shown more clearly in FIG. 5, which is designed for the particular resistor configuration or geometry on the substrate. Each multi-probe unit may comprise a plurality of layers of insulating material for mounting a plurality of cantilevered electrical probes 24 extending through cylindrical mounts 25 carried between adjacent layers of insulating material.

The probes 24 are so arranged that, when the units are placed in contact with a substrate bearing a multi-resistor network, each of the probes contacts one of the conductors carried thereon. The probes are electrically connected to contacts of a switch 26 forming a part of the bridge balance unit 12. It is particularly pointed out that the terminating end of the multi-probe unit must be specifically designed for each substrate network configuration so that the overall placement of all the probe ends will terminate with a proper geometric registration with the network configuration. As shown more clearly in FIG. 2, the probes 24 are cantilevered into the opening defined between the units 22 and 23. The platform or platen 18 also has means incorporated thereon which are used for registration purposes of the substrate with the probe unit, as will be later described.

Figure 2:
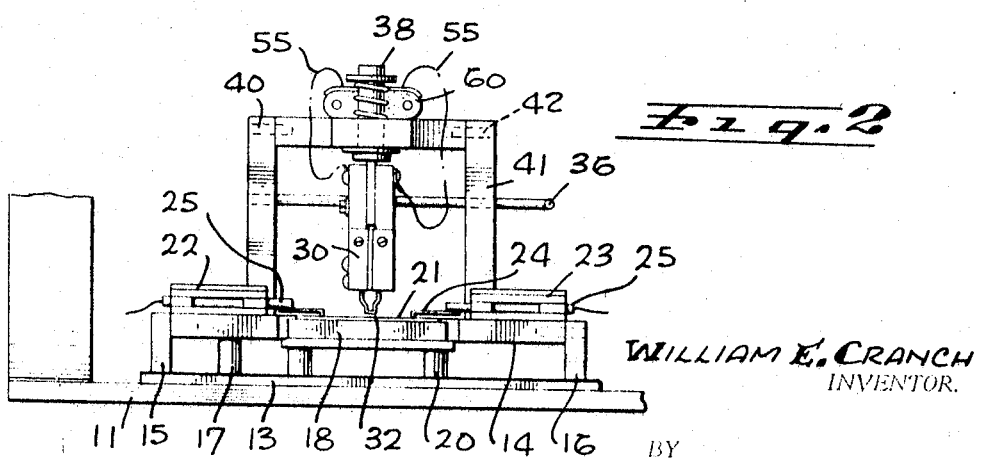
FIG. 2 is an enlarged front elevational view of the fixture shown in FIG. 1.
Figure 3:
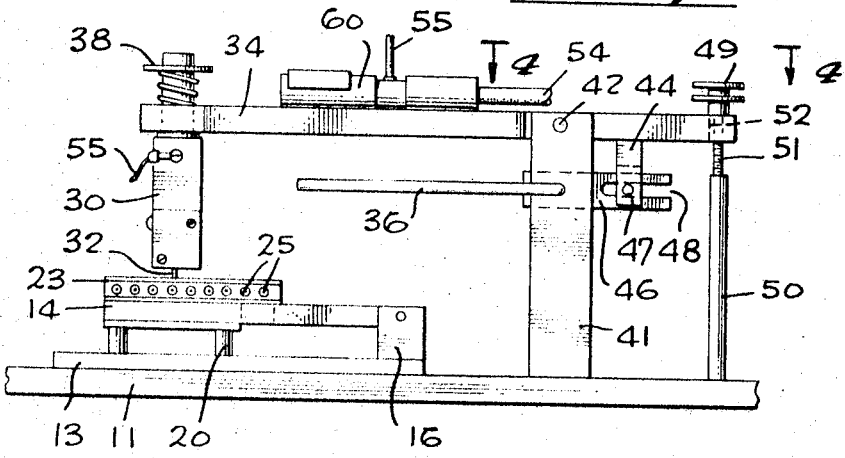
FIG. 3 is a side elevational view of the fixture shown in FIG. 2.

Supported above the substrate 22 is a heat probe 30 having a filament 32, seen in more detail in FIG. 2, which is brought into spaced relationship with respect to a preselected thin film resistor. The probe 30 is downwardly depending from the cantilevered end of a pivotal mount 34, which is caused to be manually rotated by a handle 36. As seen in more detail in FIGS. 2 and 3, the probe 30 is connected to the mount 34 by means of a spring loaded bolt 38 which assures an intimate coupling between the two portions and which also allows replacement of the probe 30. As shown in FIGS. 1, 2, and 3, the mount 34 and handle 36 are rotatably supported by spaced-apart members 40 and 41, whereby mount 34 pivots about horizontal axis 42. As shown in FIG. 3, the handle 36 is connected to the under side of mount 34 at its end opposite to the end carrying the probe by a slip linkage represented by numerals 44 and 46, whereby a pin 47 is arranged to slide within a slot 48. The handle 36 is rigidly connected to portion 46 of the slip linkage, and, upon the rotation of handle 36 and the portion 46 of the slip linkage, the portion 44 of the slip linkage executes a vertical motion which causes the mount 34 to pivot about axis 42 and thus raise or lower the probe 30. In order to adjust the space between the extreme terminating end of filament 32 and the thin film resistor when the mount 34 is in its lowest position, a threaded nut arrangement 49 is provided which cooperates with a stationary rod 50. As is seen from FIG. 3, the position of the threaded nut arrangement 49 with respect to the stationary rod 50 determines the pivotal travel of the mount 34 in its downward direction and thus the ultimate distance of the filament 32 from the thin film resistor on the substrate 22. A threaded shank 51 of the nut arrangement 49 passes through a slot 52 formed in the extreme end of the mount 34.

Figure 5:
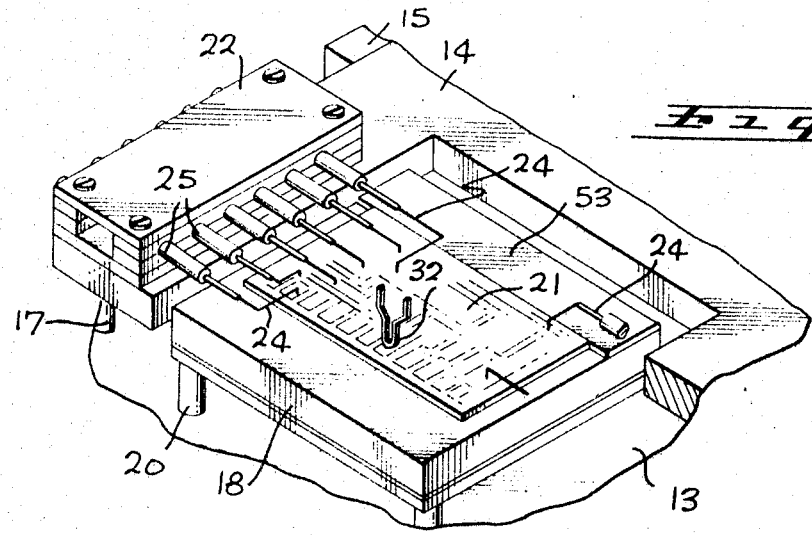
FIG. 5 is an enlarged perspective view of the substrate in registration with electrical probe units as illustrated in FIGS. 1 and 2.

Referring now to FIG. 5, it can be seen that platen 18 is disposed within the opening defined by the legs of the U-shaped plate 14. However, the peripheral edges of the platen do not contact or otherwise interfere with the ability of the plate 14 to rotate about its pivotal mounts 15 and 16. The upper surface of platen 18 is provided with a stop element 53 adapted to abut against the edge of the substrate 21. By this provision, successive substrates having the same circuit network can be properly registered on the platen 18 so that the plurality of probes 24 will align with preselected thin film resistors or other circuit components carried by a multiplicity of substrates.

In operation, the probe 30 is brought into position near the substrate 22, and a current is applied to the filament 32 by means of leads 54 and 55 connected to the power supply 8. Heat from the filament is applied to a resistor on the substrate 21 for a preselected period of time, and then the power is either automatically discontinued or the probe 30 is manually raised from its position proximate substrate 21. The bridge balance unit 12 is then utilized to compare through probe units 22 and 23 the value of the thin film resistor on the substrate 21 with a standard resistor contained within the unit 12. As is shown in FIG. 1, a knob 26 is employed to select the standard resistor desired to be used for comparison to the particular thin film resistor under test. The signal from the bridge balance circuitry within the unit 12 is applied to a meter 58 which indicates whether the bridge balance circuit is in a null condition or whether the values of the thin film resistor and the standard resistor are in agreement within preselected tolerance limits. If they are not within such limits, the probe 30 is again brought into position, or reenergized, to appy further heat to the thin film resistor. If the filament 32 is operated in a continuous power mode, with the mount 34 being raised after a predetermined amount of time, a socket 60 may be utilized to connect a series of such test fixtures 10. It is readily apparent that the probe 30 may be readily repositioned about the surface of the substrate 22 to accommodate the adjustment of other thin film resistors without the necessity of readjusting the test fixture 10 from the initial setting provided by the limit stop means comprising nut member 49 and post 50.

Engagement of the upper surface of the end of mount 34 with the under side of the nut member 38 establishes the fixed spaced-apart relationship of the filament 32 with respect to the thin film resistor. The weight of the probe 30 normally causes the mount 34 to pivot so that the filament is located in close proximity to the substrate. Upon manual rotation of the mount 34 via handle 36, movement will be stopped when the under side of the end of mount 34 contacts the upper terminating end of post 50.

Although the embodiment shown in FIGS. 1 to 3, inclusive, illustrates the employment of an electrically heated probe, it is to be understood that the probe may take the form of a hot gas probe such as is described in the perviously noted copending application for United States Letters Patent. Such a probe may be readily carried by the mount 34 so that the discharge end thereof will be critically spaced from the thin film resistors.

Figure 4:
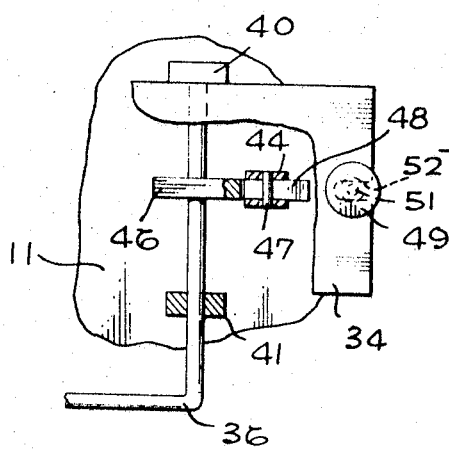
FIG. 4 is a sectional view of the pivot linkage shown in FIG. 3 as taken in the direction of arrows 4—4 thereof.

A second embodiment of the invention is shown in FIGS. 4, 5, and 6 wherein heat is applied to the thin film resistor by means of a pair of electrodes adapted to be disposed in contact with the opposite ends of the resistor. The emobdiment comprises a base 62 upon which is mounted a block 64 used to support the substrate 21 upon which the thin film resistor is mounted. Heat is applied to the thin film resistor by means of a pair of electrodes 65 and 66 which are arranged to cantilever outwardly from a mount 67 which is pivotally connected at one end between side plates 68 and 70 by pins 72. The forward ends of the electrodes 65 and 66 are biased upwardly by means of a leaf spring 73, shown in FIG. 8, which normally expands between the base 62 and the under side of mount 67 so as to pivot the mount. The electrodes 65 and 66 are positioned in aligning engagement with the ends of the thin film resistor by means of a manually actuated cam 76 rotatably carried on side plate 68 which includes a cam surface 77 that abuts against a rod 78 outwardly projecting from the side of mount 67. It is seen that the pivotal mount 67 and thus the electrodes 65 and 66 are forced upward by the counterclockwise rotation of the cam 76 and that, upon release of the cam 76, the leaf spring 73 lowers the mount 67 and the electrodes 65 and 66. It should be noted that, while a final downward motion of the mount 67 is determined by the striking of the rod 78 against the side plate 68 at the bottom of a slot 79, the clockwise travel of the mount 67 can also be regulated by a lip 80 of the cam 76 striking a pin 81. The rotational travel of the cam 76 may be varied in fine increments by varying the diameter of the pin 81 or by placing the pin 81 in an elongated slot with suitable positioning means, if desired. The cam 76 may also be used to raise the mount 67 beyond the amount provided by the leaf spring 73. In this regard, the pin 72 also acts as a stop for the cam 76 to limit the counterclockwise rotation thereof.

Power for energizing the electrodes or for performing tests on the network of resistors carried by the substrate as well as various switches and meters are contained within an instrument housing 75. Inasmuch as the present invention does not pertain to such electrical networks or circuitry for performing tests or other functions in which the fixture 61 may be employed, circuit details are neither shown nor described. For such details, reference may be taken with respect to the previously cited copending application for United States Letters Patent.

As stated previously, the electrodes 65 and 66 are arranged to be cantilevered outwardly from the mount 67, and the distance between extended ends of the electrodes 65 and 66 may be increased in width therebetween. To accomplish this, the electrodes are secured to a pair of electrode holders 82 and 83, as illustrated more clearly in FIG. 7, which are pivotally secured to the upper surface of mount 67 at points 84 and 85. The electrode holders 82 and 83 are connected to a rectilinear moving element 86 by means of a pair of flexible rods 87 and 88. The element 86 is threadably coupled to a shank 89 of a thumb screw 90 which is supported on a fixed block 91 connected to the rear end of mount 67.

Referring to FIG. 9, an enlarged view of the electrode movable mounting assembly is shown wherein element 86 is formed with an inner cavity 92 through which shank 89 travels and in which the ends of rods 87 and 88 terminate. To prevent backlash and undesirable binding of the rods with the element as the element is moved on the lead screw shank 89, each of the rods is pivotally seated in outwardly tapering bores 93 and 94, respectively. Preferably, rods 87 and 88 are constructed from commercially available piano wire so that the rods are characterized as being strong and resilient. The rods indicated in broken lines by A represent closure of the terminating electrode ends as the element 86 moves rearward, while B represents a maximum opening between the terminating ends as element 86 moves forward.

In operation, the lateral adjustment of the distance between the electrodes 65 and 66 is accomplished by the rotation of the thumb screw 90. The rotation of the thumb screw 90 moves the element 86 along the shank 89 of the screw and thus along the upper surface of mount 67 in a direction toward or away from the substrate 22. Such forward or backward motion of the element 86 causes the flexible rods 87 and 88 to be carried along with the element 86 and to exert a force on the electrode holders 82 and 83, causing them to pivot around their pivotal points 84 and 85. In such a fashion, the lateral forces provided by the element 86 and the flexible rods 87 and 88 urges the electrodes 65 and 66 into a preselected lateral disposition with respect to one another. It should be noted that, in order to provide uniform motion of the electrode holders, the tapered bores in the element 86 which receive the flexible rods 87 and 88 should have chamfered outer edges in order to avoid any binding action. Leads 95 and 96 are coupled to electrode holders 82 and 83 and are connected to the power supply within housing 75, which provides sufficient electrical current to heat the thin film resistor by passage therethrough. It should be realized, of course, that leads 95 and 96 could be connected also to the measurement apparatus included in housing 75 in order to measure the value of the thin film resistor.

It is thus seen that by employing the probe and electrode apparatus of the present invention a test fixture is derived which avoids overpositioning problems with respect to the tips of the probes and the resistor undergoing adjustment or test. In addition, the probes may be readily positioned about the surface of the substrate to accommodate the testing of other electrical components without the necessity of readjusting the fixture from its initial setting. Thus, by employing the stop means and biasing means of the present invention, the probes can be rapidly placed in position with respect to an individual component to perform a particular test and then removed to other components on the substrate for tests on a mass production scale. In this fashion, individual adjustment of the fixture from component to component is not required.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

The embodiments of the invention in which an exclusive property or privilege is claimed are defined as follows:

1. A test fixture useful for heating a film element exposed on a substrate comprising:
  holding means for holding said substrate in a fixed location;
  electrical movable heating probe means carried on said holding means adapted to conduct an electrical current for heating the film element exposed on the substrate;
  electrical leads connecting said heating probe means to a power source;
  limiting means operably coupled to said heating means for limiting the height of said heating means relative to the surface of said substrate; and
  placement means for selectively disposing said heating means with respect to the film element without causing physical or thermal damage thereto.

2. The test fixture of claim 1 wherein:
  said placement means for selectively disposing said heating means with respect to the film element includes means for fixedly establishing a predetermined spacing between the terminating end of said heating means and the film element whereby no physical contact occurs.

3. The test fixture of claim 2 wherein:
  said heating means for heating the film element includes an elongated probe cantilevered outwardly over the substrate for radiating heat onto the substrate, and wherein
  said limiting means includes control means for controlling the intensity of the radiant heat as applied to the film element.

4. The test fixture of claim 1 wherein:
said placement means for selectively disposing said heating means with respect to the film element includes means for placing said heating means over preselected portions of the substrate and resilient biasing means for normally retracting said heating means away from the substrate.

5. The test fixture of claim 4 wherein:
said heating means contacts opposite ends of the film element and is adapted to pass an electrical current therethrough, and further includes means for supplying said current to said heating means.

6. A test fixture useful for heating a film resistor fixed to a substrate so as to adjust the electrical characteristics thereof, comprising:
support means for holding said substrate;
electrical heating means cantilevered over the substrate for applying radiant heat to the film resistor thereon;
electrical leads connected said heating means to a power source; and
mechanical means operably coupled to said heating means for controlling the quantity of radiant heat received by the film resistor, said mechanical means including limit means for selectively disposing said heating means between an upper position and a lower position with respect to the substrate with a predetermined spacing therebetween.

7. The test fixture of claim 6 wherein:
said heating means includes a heat probe adapted to generate radiant heat from the terminating end thereof and means for supporting said heat probe on one end thereof with respect to the substrate, said supporting means being adapted for pivotal motion on said holding means normal to the substrate.

8. The test fixture of claim 7 wherein:
said heat probe and said supporting means are coupled by spring biasing means.

9. The test fixture of claim 7 wherein:
the pivotal motion of said supporting means with respect to the substrate is controlled by limited stop means carried on said holding means.

10. The test fixture of claim 9 wherein:
said limited stop means includes a rod stationary with respect to said supporting means and means passing through said supporting means and threading said stationary rod.

11. The test fixture of claim 10 wherein:
said stationary rod and said substrate are disposed on opposite sides of the pivot point of said supporting means, whereby the motion of said supporting means toward said substrate is limited by the engagement of said supporting means with said means passing through said supporting means and threading said rod.

12. The test fixture of claim 9 wherein:
said supporting means is pivotally rotated around its pivot point by means of slip linkage means coupled to said supporting means and actuated by pivotally supported adjustment means.

13. A test fixture useful for sequentially heating a plurality of film resistors carried on a supporting substrate, comprising:
support means for supporting said substrate;
electrical heating means for heating a preselected resistor of the plurality;
electrical leads connecting said heating means to a power source; and
placement means operably coupling said heating means with said supporting means for selectively disposing said heating means with respect to said preselected resistor for adjusting the operating parameters of said preselected resistor of the plurality on the substrate.

14. The test fixture of claim 13 wherein:
said placement means for heating said preselected resistor includes means for passing an electrical current of a preselected value through said preselected resistor on the substrate.

15. The test fixture of claim 13 wherein:
said heating means includes a pair of electrodes having terminating ends adapted to simultaneously and releasably contact the opposite ends of said preselected resistor.

16. The test fixture of claim 15 wherein:
biasing means are provided for resilient biasing said electrode terminating ends a predetermined distance apart from one another.

17. The test fixture of claim 16 wherein:
pivot means supporting said electrodes include actuating means for actuating the movement of said electrodes about their pivot point, said actuating means including means having a motion substantially normal to the direction of motion of said electrodes.

18. The test fixture of claim 17 wherein:
said actuating means having said substantially normal motion and said pivot means for pivotally supporting said electrodes are coupled by a plurality of flexible rods.

19. The test fixture of claim 18 wherein:
said flexible rods are fixedly secured in said means having said substantially normal motion through a plurality of respective openings, said openings having the outer edges thereof chamfered.

20. The test fixture of claim 13 wherein:
said placement means for selectively disposing said heating means with respect to said substrate includes means for pivotally supporting said heating means with respect to said substrate and means for normally biasing said pivotally supporting means away from said substrate.

21. The test fixture of claim 20 wherein:
said pivotally supporting means is adapted to be cam actuated.

22. The test fixture of claim 21 wherein:
cam lever means are provided for cam actuating said pivotally supporting means and limit stop means are provided for limiting the rotational motion of said cam actuating means.

23. A fixture for holding a substrate having electrical components carried on one side thereof and being useful for adjusting and testing the operating parameters of a selected component carried thereon, comprising:
supporting means for supporting the substrate so that the components are exposed;
electrical heating probe means movably mounted with respect to said supporting means adapted to move toward and away from the selected component in registration therewith and being operable to effect changes in the operating parameters of the selected component; electrical leads connecting said heating probe means to a power source; and
coupling means operably connecting said heating probe means with respect to said supporting means for moving said heating probe means forward into an operational position with respect to the selected component so that the component is not subjected to damage therefrom when said heating probe means is in said operational position.

24. The fixture as defined in claim 23 wherein said probe means comprises:
a pivotally supported mount;
an electrode fixed on one end of said mount cantilevered over the substrate and terminating in a filament adapted to radiate heat therefrom when said probe means is in said operation position; and
adjustable limit means carried on said supporting means in cooperating relationship with the other end of said mount so as to restrict the spacing between said filament and the selected component to a predetermined distance.

25. The fixture as defined in claim 24 wherein:
said supporting means includes rigid spaced-apart posts separated by said mount; and
pivot means rotatably coupling said mount to said posts.

26. The fixture as defined in claim 25 wherein:
said coupling means includes a manually operated handle rotatably mounted on said posts; and
lost motion slippage linkage coupled between said handle and said mount operable in response to rotation of said handle to pivot said electrode via said mount so that said filament is disposed in said operational position in closed fixed spaced-apart relationship to the selected component.

27. The fixture as defined in claim 23 wherein said probe means comprises:
a pivotally supported mount;
a pair of spaced electrodes pivotally secured to said mount and having their major length cantilevered from one end thereof terminating in a pair of component engaging ends disposed over the substrate; and
lead screw means movably coupling said electrodes to said mount operable to adjust the distance between said electrode terminating ends so as to register said terminating ends with the opposite sides of the selected component when said probe means is in said operational position.

28. The fixture as defined in claim 27 including:
a leaf spring connected between said mount and said supporting means for normally biasing said electrode terminating ends away from the substrate; and
rotatable cam means interposed between said supporting means and said mount for overcoming the bias of said leaf spring to permit said electrode terminating ends to contact the opposite sides of the selected component.

29. The fixture as defined in claim 28 including:
limit stop means outwardly projecting from said mount operable in cooperation with said cam means to restrict the amount of contact pressure applied by said electrode terminating ends to the opposite sides of the selected component.

30. In a fixture having lateral holding and registration means for sequentially accepting a plurality of substrates having the same electrical circuit and component geometry exposed on one surface of each substrate and having an electrical heating means movably supported over the substrate held in the holding and registration means whereby heat radiating therefrom to a selected component on the substrate is effective to adjust the operating parameter of the selected component, electrical leads connecting said heating means to a power source, the improvement which comprises:
raising and lowering means for selectively raising and lowering the heating means with respect to the selected component so as to provide a predetermined spacing between the extreme terminating end of the heating means and the selected component so that no contact occurs therebetween and for controlling the exposure of the selected component to the heat radiated from the heating means.

31. The fixture as defined in claim 30 wherein:
said raising and lowering means includes a mechanical limit stop selectively engageable with the heating means to restrict advancement of the heating means beyond the predetermined spacing between the terminating end of the heating means and the selected component.

References Cited
UNITED STATES PATENTS

| | | | |
|---|---|---|---|
| 3,308,528 | 3/1967 | Bullard et al. | 29—620 |
| 3,324,706 | 6/1967 | Russell | 73—1 |
| 3,388,461 | 6/1968 | Lins | 219—121 X |

VOLODYMYR Y. MAYEWSKY, Primary Examiner

U.S. Cl. X.R.

29—593, 620; 73—1; 324—63